Figures 1A, 1B, 1C:
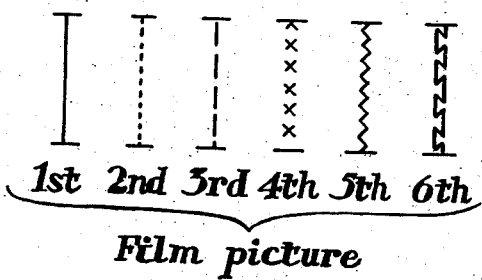

Oct. 7, 1941.     A. E. ADAMS     2,258,311
SCANNING METHOD
Filed Oct. 19, 1938     3 Sheets-Sheet 1

Inventor
Albert Ernest Adams

Oct. 7, 1941.  A. E. ADAMS  2,258,311
SCANNING METHOD
Filed Oct. 19, 1938  3 Sheets-Sheet 2
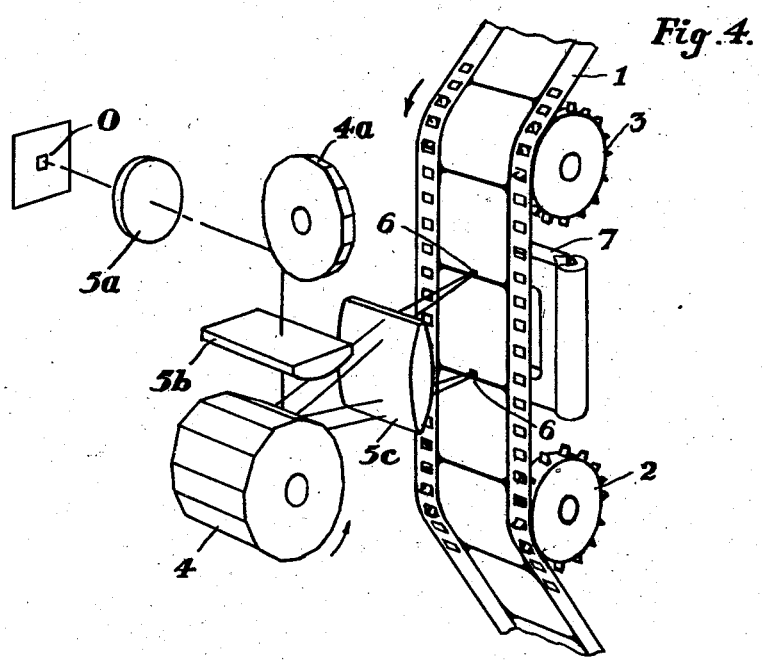
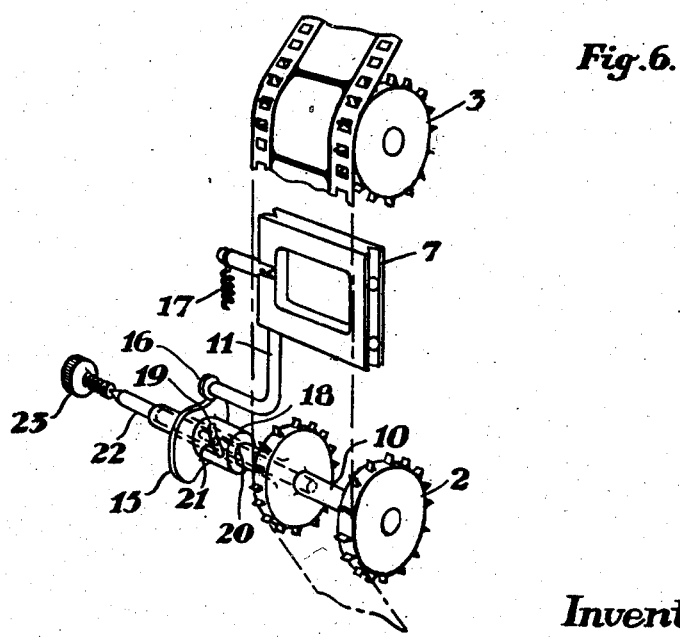
Inventor
Albert Ernest Adams.

Oct. 7, 1941.     A. E. ADAMS     2,258,311
SCANNING METHOD
Filed Oct. 19, 1938     3 Sheets-Sheet 3

Inventor
Albert Ernest Adams

Patented Oct. 7, 1941

2,258,311

UNITED STATES PATENT OFFICE 2,258,311

SCANNING METHOD

Albert Ernest Adams, Kensington, London, England, assignor to Scophony Limited, Wells, Somerset, England, a company of Great Britain Application October 19, 1938, Serial No. 235,866

15 Claims. (Cl. 178—7.1)

This invention relates to a method of, and means for, scanning pictures of a continuously moved film in order to convert the distribution of brightness in space of these pictures into a corresponding chronological succession of certain occurrences such as electrical impulses. It will be understood that the invention relates particularly to the scanning of a continuously moved film in a television system. Terms such as "scanning spot," "scanning line," etc. will hereinafter be used without explanation as having well established meanings widely known among those concerned with television in any form. More particularly, the invention relates to that type of scanning in which the scanning action and the action of illuminating the "recording device" (e. g. photo-cell) with light from the object to be televised, are combined, at least as regards the frame scanning component.

In a well known method, hereinafter referred to as "conventional interlaced scanning," of scanning a continuously moved film in a television transmitter, the scanning spot has, in the direction at right angles to the line scanning direction a scanning movement applied thereto opposite in direction, and equal in velocity to the film movement. For instance, the film moves with such a speed that 25 per second of its pictures pass a given point fixed in space (film transport frequency=25 pictures per second) and the scanning spot moves over the picture field in such a manner that it would scan 25 pictures per second if the film were stationary. In consequence, the scanning spot sweeps over a whole film picture in 1/50 of a second (in other words: the "picture traversal frequency" is fifty cycles per second). The arrangement of the film, of the scanning device and of the diaphragm determining the picture field is so chosen that each film picture is scanned twice in the manner described while its part thus scanned is in register with a part of the picture diaphragm aperture; and that the lines along which two subsequent scans of a picture occur are intercalated. One complete scan of a picture thus takes 1/25 of a second.

This method is very convenient and can be carried out with the aid of comparatively simple means at the transmitter and receiver. The advantages of the method are, however, dependent upon the fact that the picture traversal frequency is fifty cycles per second, and this frequency is fixed, in turn, by the frequency of the supply mains, since, in all present-day television systems employing interlaced scanning, the picture traversal frequency is made equal to the frequency of the supply mains. Hence, such a method is only practical when the frequency of the supply mains is equal to 50 cycles per second.

Difficulties arise where, as in the case of the U. S. A., a mains frequency is used which differs considerably from 50 cycles per second. This is due to the fact that there exists a standardised film transport frequency (24 pictures per second) from which it is undesirable to depart in more than a small degree. As may be seen from the example given, it is not objectionable to use a film transport velocity of 25 instead of 24 pictures per second. However, to adapt the method outlined above to the mains frequency of 60 cycles per second used in the U. S. A., the film transport frequency would have to be increased to 30 pictures per second, and this is definitely objectionable. It may be assumed that depending on the demands placed on the satisfactoriness of the film reproduction, the mains frequency and hence the picture traversal frequency should be equal to twice the standard film transport frequency within about 5, 7.5 or 10% if the method set forth is to be applied with satisfactory results.

An object of this invention is to overcome this difficulty, and with this object in view, the invention provides a method of and means for scanning a continuously moved film to be particularly applied to a system where the available mains frequency differs by more than 5% from twice the film transport frequency. According to one feature of the invention a series of scanning spots is caused to perform frame scanning movements over the pictures of the film in the direction opposite to the direction of the film movement and with a picture traversal frequency which is different from twice the film transport frequency.

Obviously, the frequency, hereinafter termed "spot frequency," with which the scanning spots have to pass a given point fixed in space (the line scanning movement being disregarded) is equal to the difference between the picture traversal frequency and the film transport frequency.

In the example given, of a mains frequency of 60 cycles per second and a film transport frequency of 24 pictures per second, the spot frequency is accordingly made equal to 36 scans per second of a stationary film picture. The scanning point thus sweeps over each of the moved film pictures in 1/60 of a second, i. e. the picture traversal frequency is 60 cycles per second.

Figure 2:
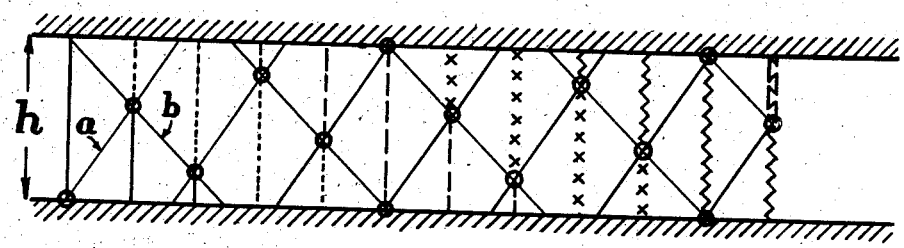
Figure 3:
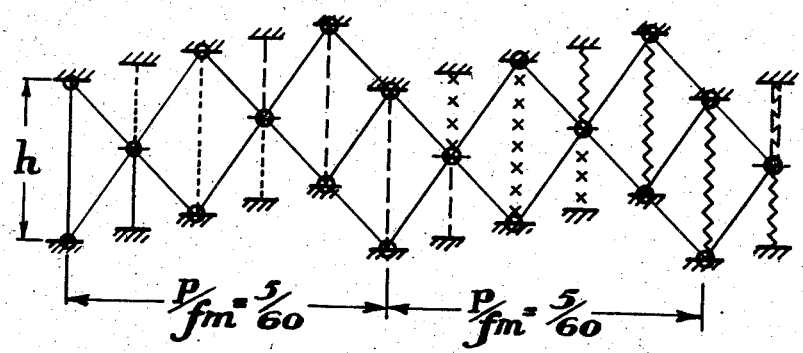

In further explaining this invention, reference will be made to the appended drawings, of which Figs. 1a—c contain an explanatory introduction of the symbols used in Figs. 2 and 3, for film pictures, shutter edges, and the scanning spot, Fig. 2 is a diagram illustrating the relative movement of the film pictures and the scanning spots obtained according to one feature of the invention with a picture traversal frequency of 60 cycles per second and a film transport frequency of 24 pictures per second, and a certain problem associated with this type of relative movement, Fig. 3 is a diagram illustrating the relative movements of the film pictures, the scanning spots and the scanning field obtained according to the invention with the same frequencies as used in Fig. 2.

Figure 5A:
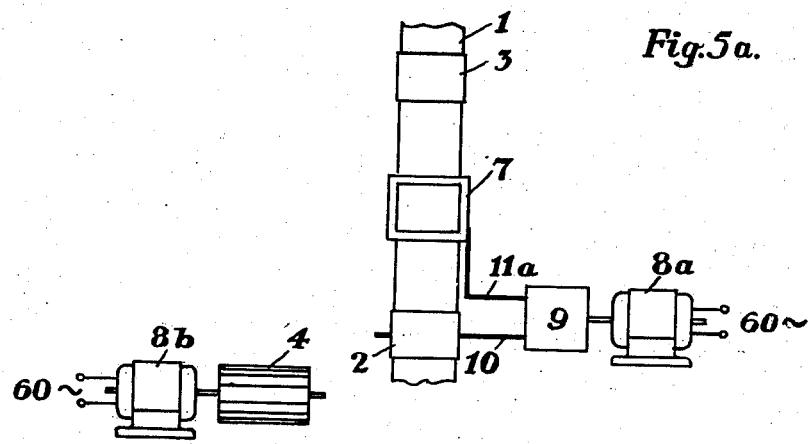
Figure 5B:
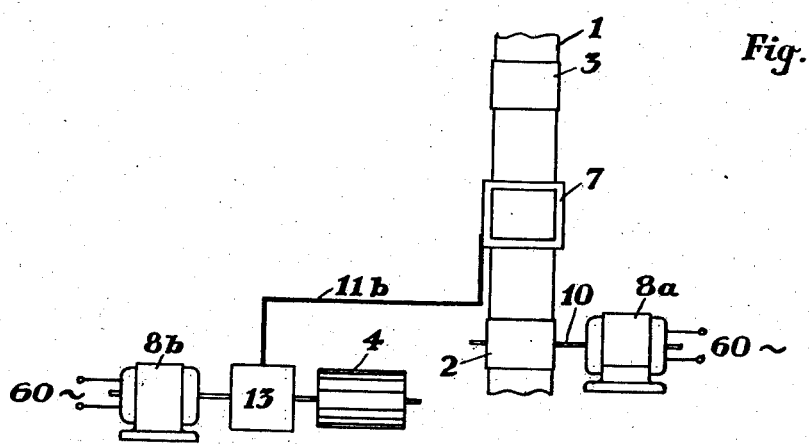
Figure 5C:
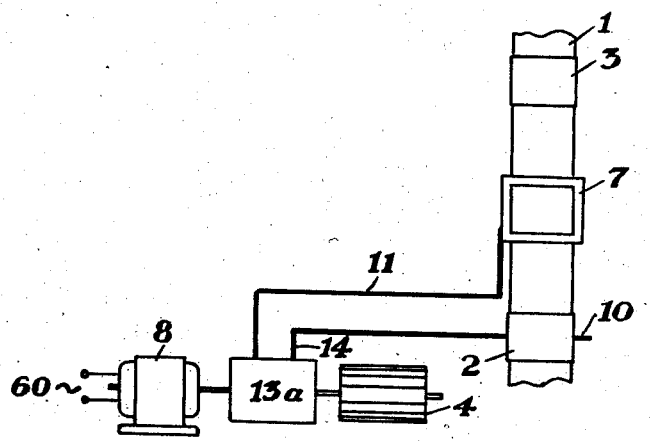

Fig. 4 is a perspective view of a picture film, a scanning unit, a scanning field determining unit and part of the optical system associated therewith, showing the spacial relationships involved, Figs. 5a—c are illustrations, reduced to lowest terms, of certain embodiments of the invention, and Fig. 6 is a perspective view of a detail of one embodiment of the invention.

Referring to Figs. 1a—c, in which certain symbols are introduced to illustrate the phenomena occurring in the scanning or picture plane, it is seen that the horizontal coordinate of this plane is neglected. Thus, in Fig. 1a, a number of film pictures are shown each represented, not by a rectangle, but by substantially a straight vertical line the length of which stands for the height of a film picture (the lines representing different film pictures having been given different configurations for the sake of clarity). Further, in the following explanations and claims a scanning spot or series of scanning spots will be treated as one single scanning spot as long as it is effectively involved in one unidirectional and steady frame scanning operation, and no longer. For example, in well known types of mechanical scanning, consecutive line scans are produced by the operation of different scanning elements such as apertures in a scanning disc or faces on a scanning mirror polygon. This might suggest that what different lines are scanned by should be called different spots. However, different lines will herein be looked upon as being scanned by the same spot if they are scanned within the same unidirectional and steady frame scanning operation. The term "frame scanning operation" or "frame scanning movement" as herein used does not imply that any one of such operations or movements is restricted to the traversal of one single frame, but only that it is constituted by the component of the scanning spot movement at right angles to the line scanning (or "horizontal") component. "Steady" frame scanning movement means one that changes the scanning spot position in the frame scanning direction by an amount of the order of the width of a line during one line scanning period. The term "movement of the scanning spot" will be used in the following explanations to refer to the frame scanning (or "vertical") component only. It is understood that the horizontal component of the actual scanning spot movement is even considerably more "marked" than the vertical component in so far as it produces a spot displacement by the length of a line in a period in which the vertical component produces a displacement by an amount of the order of the width of a line only. However, the invention can be fully understood without reference to anything occurring in the horizontal coordinate, and it is convenient to treat the scanning field as a one-dimensional formation and to use the horizontal coordinate as time coordinate.

If this is done the vertical movements of the scanning spots and of the edges of the film pictures will be represented by two sets of lines having certain slopes depending on the scanning and film picture feed speeds respectively. Thus, if the horizontal direction from the left to the right is taken in the usual way as the positive direction of the time coordinate and if an upward scanning spot movement and a downward film picture movement are assumed, the first of said movements being supposed to be faster of the two, then the movement of the scanning spots will be represented by a set of parallel lines ascending towards the right, and the movement of the upper and lower edges of the film pictures by a set of parallel lines descending towards the right, the first of said lines being steeper than the last.

This is shown in Fig. 2. Line a and the lines parallel thereto represent the scanning spot movement, line b and the lines parallel thereto the movement of the edges of the film pictures. This figure illustrates a special example (to which the invention is by no means restricted but which is of particular practical importance; cf. above), in which the film is moved by ⅖ of the height $h$ of one picture every sixtieth of a second so that 24 pictures per second will pass a given mark, and in which the scanning spot scans ⅗ $h$ during the same time of ¹⁄₆₀ seconds which means a spot frequency of 36 cycles per second.

It is seen that the lines of the set comprising line $a$ coincide with an edge of a film picture at the end of every sixtieth of a second. This means that the scanning spot sweeps over the whole height $h$ of a picture within ¹⁄₆₀ of a second, or in other words that the picture traversal frequency is 60 cycles per second.

However, Fig. 2 further reveals a serious difficulty. Consider for instance the second sixtieth of a second. The scanning spot which has completed the scanning of the first film picture proceeds to scanning the second one (which action is illustrated in detail by the manner in which line $a$ rises above line $b$); but after it has scanned ⅔ of it, it is masked by the upper edge of the picture field shutter. At the same time the next scanning spot rises above the lower edge of the shutter and begins another scan of the top third of the first picture. This means that the parts of the pictures are not scanned, and consequently, in television, picture signals are not transmitted, in the proper sequence, and that certain parts of a film picture are scanned more often than other parts of the same picture (as is here shown in the case of the first picture the top third of which is scanned three times whereas the rest of this picture is scanned twice). The same fault attends the scanning which occurs during the seventh sixtieth of a second, and a similar fault attends the scanning which occurs during the fourth and ninth sixtieths of a second.

In order to overcome this difficulty the invention comprises as a further feature the method of, and means for periodically varying the position in space of the scanning field in such a manner that the proper sequence of scanning is maintained and that all parts of each individual picture are scanned the same number of times. This is done by reproducing as far as is necessary the condition in respect of spacial relationships between film picture, scanning spot, and shutter aperture, which obtain in the case of conventional interlaced scanning.

As will be easily verified by those skilled in the art, these spacial relationships differ from those appearing from Fig. 2 in the following respect. At the end of every second picture traversal the scanning spot reaches the top end of the picture (if the scanning movement occurs in the upward direction) at the top edge of the scanning field determined by the shutter aperture. At the end of every one of the remaining picture traversals the scanning spot reaches the top end of the picture half way between the top and bottom edges of the said scanning field.

How this condition is reproduced in accordance with this invention will now be described in generalised terms as regards the frequencies and ensuing spacial relationships involved. Reference will be made to Fig. 3 in which the same special values of frequencies, etc., are used as before.

Let $f_m$ be the picture traversal frequency,
$f_t$ the film transport frequency, and
$f_s$ the spot frequency, which, according to what has been said above when defining this frequency, is equal to $f_m - f_t$.

(in the example given $f_m = 60$ cycles per second
$f_t = 24$ pictures per second, and
$f_s = 36$ cycles per second).

During $1/f_m$ seconds, a film picture moves by $f_t/f_m$ of its height $$h_i = \frac{f_t}{f_m} \cdot h$$

in one direction, and the scanning spot by $$\frac{f_s}{f_m} \cdot h$$

in the opposite direction. As $f_s \neq f_t$, the point where the scanning spot reaches the upper edge of a picture, will wander steadily from its two normal positions, i. e. the two positions, at one edge and half way between the upper and lower edges, which it assumes in the case of conventional interlaced scanning. The displacement in question from any one of these positions works out to be equal to $$\frac{f_s - f_t}{2f_m} \cdot h$$

for every $1/f_m$ second. The velocity of the displacement is accordingly equal to $$\frac{f_s - f_t}{2} \cdot h$$

In the example under consideration, $$\frac{f_t}{f_m} \cdot h = \tfrac{2}{5} \cdot h; \quad \frac{f_s}{f_m} \cdot h = \tfrac{3}{5} \cdot h; \quad \frac{f_s - f_t}{2f_m} \cdot h = \tfrac{1}{10} \cdot h;$$

$$\frac{f_s - f_t}{2} \cdot h = 6 \cdot h \left(\frac{mm.}{sec.} \text{ if } h \text{ is given in mm.}\right)$$

In accordance with this invention, therefore, the scanning field is periodically displaced, the velocity of the displacement being, during the greater part of the displacement period, equal to $$\frac{f_s - f_t}{2} \cdot h$$

the displacement being unidirectional during said part of the period, viz. in the frame scanning direction if $f_s > f_t$, and in the direction of the film movement if $f_t > f_s$. It is seen that the symbols as they have been introduced herein give a negative figure for a velocity of displacement opposite to the frame scanning direction.

During the remaining part of the displacement period the scanning field is brought back to its original position. This is conveniently done in such a manner that during one picture repetition period ($1/f_m$ seconds), the edge of the scanning field follows exactly a film picture edge if $f_s > f_t$, and a scanning spot if $f_s < f_t$. The velocity of the last mentioned displacement of the scanning field is accordingly equal to the smaller of the film transport and spot frequencies multiplied by the picture height, or, in other words equal to the smaller of the spot and the film velocities. The direction of this displacement is, of course, opposite to that of the first mentioned one.

As the return of the scanning field to its original position occurs during a time of $1/f_m$ seconds and with a velocity of $f_t \cdot h$ (or $f_s \cdot h$, as the case may be), it consists in a displacement by $$\frac{f_t}{f_m} \cdot h \left( \text{or } \frac{f_s}{f_m} \cdot h \right)$$

as the case may be).

The displacement in the opposite direction which has been effected during the preceding part of the same displacement period must be of equal amount. If the full displacement period is $p/f_m$, the last mentioned part of the displacement period has a length of $$\frac{p-1}{f_m}$$

and the displacement effected during this time is equal to $$\frac{p-1}{2} \cdot \frac{f_s - f_t}{f_m} \cdot h$$

which,
according to the foregoing, must be equal to $$\frac{f_t}{f_m} \cdot h$$

Similarly, it is found in the case $f_t > f_s$ that $$(p-1) \cdot \frac{f_t - f_s}{f_m} \cdot h$$

must be equal to $$\frac{f_s}{f_m} \cdot h$$

Thus, $$p = 2 \cdot \frac{f_t}{f_s - f_t} + 1 = \frac{f_s + f_t}{f_s - f_t} = \frac{f_m}{f_s - f_t} \text{ with } f_s > f_t;$$

$$p = 2 \cdot \frac{f_s}{f_t - f_s} + 1 = \frac{f_t + f_s}{f_t - f_s} = \frac{f_m}{f_t - f_s} \text{ with } f_t > f_s$$

The frequency $f_d$ of the displacement is $$f_m/p = f_s - f_t$$

or $f_t - f_s$, as the case may be), i. e. equal to the difference between spot frequency $f_s = f_m - f_t$ and film transport frequency $f_t$.

In the example under consideration $$p = \frac{60}{36 - 24} = 5, \text{ and } f_d = 12 \text{ cycles per second}$$

The full displacement period is equal to $\tfrac{5}{60}$ second $= \tfrac{1}{12}$ second. During $\tfrac{4}{60}$ second the scanning field is displaced by $\tfrac{1}{10}$ .h for each sixtieth of a second in the frame scanning direction, and during the next sixtieth of a second it is displaced by $\tfrac{2}{5}$ .h in the opposite direction.

This is illustrated in Fig. 3, which clearly shows that the displacement of the scanning field in the manner set forth obviates the difficulty explained in connection with Fig. 2. In Fig. 3, as in Fig. 2, the lines ascending towards the right represent the scanning spot movement, and the lines descending towards the right the movement of the upper and lower edges of the film pictures. It is seen that the points of intersection of these lines, each representing the arrival of the scanning spot at one of the upper and lower edges of the film pictures, now lie in each case either at the boundaries of the scanning field or half-way between these boundaries. The result is evidently that the pictures are now scanned in proper sequence, and all parts of any individual picture are scanned the same number of times.

As Fig. 3 further shows, the return displacement of the scanning field results in the picture which, at the moment the return is initiated, has just been completely scanned by two picture traversals or half scans, being subjected to a third half scan. Thus, the third picture is swept over by the scanning spot during the fourth, fifth and in addition, during the sixth sixtieths of a second. Similarly the fifth picture is swept over by the scanning spot during the ninth, tenth and eleventh sixtieths of a second. This, however, is doubtless permissible. In the special case under consideration groups of two and three half scans respectively alternate. But this is not the general rule; a third half scan of a picture will, as can be easily verified, occur at most once per displacement period, since it is, as stated, a result of the return displacement. For instance, if $f_m=70$ cycles per second $f_t=30$ pictures per second (a case which seems of minor practical importance but provides a useful example in the present connection), $f_s$ will be equal to 40 scans per second, and $$p = \frac{70}{40-30} = 7$$

In that case one treble-half-scan will be followed by two successive ordinary double-half-scans.

In order that the invention may be carried out properly, $p$ should be a whole number, i. e. $f_m$ should be divisible by $f_s - f_t = f_m - 2f_t$. The fulfilment of this condition is not likely to cause a difficulty in any case occurring in practice, considering that slight departures from the standard film transport frequency of 24 pictures per second are permissible. According to a subsidiary feature of the invention therefore the film transport frequency is so chosen that the mains or picture traversals frequency is divisible by the difference between itself and twice the film transport frequency. It will be understood that simple numerical relationships (large common divisors) between the frequencies involved are desirable, particularly from the constructional point of view (cf. below p. 12).

For the reduction to practice of the invention a well defined optical field is required which embraces all positions which any part of the scanning field assumes during the process. The height of the well defined optical field in the scanning plane should accordingly be equal to $$h\left(1 + \frac{f_t}{f_m}\right) \text{ with } f_s > f_t$$

and equal to $$h\left(1 + \frac{f_s}{f_m}\right) \text{ with } f_t > f_s$$

As regards apparatus, the invention provides, in a system in which a film is continuously moved with a transport frequency of $f_t$ pictures per second, means for applying to a sequence of scanning spots frame scanning movements over the pictures of the film in the direction opposite to the direction of the film movement and with a picture traversal frequency $f_m$ which is different from $2f_t$, and means for periodically displacing the scanning field, the displacement frequency $f_d$ being equal to the difference between $f_m - f_t$ and $f_t$. The last mentioned means are preferably adapted to displace the scanning field steadily by the height of one film picture multiplied by $1/f_m$ times the lower one of the frequencies $f_m - f_t$ and $f_t$ during $1/f_d - 1/f_m$ seconds, and to bring it steadily back into its original position during the subsequent $1/f_m$ seconds.

Referring to Fig. 4, 1 is a picture film driven over, and partly by, two sprocket drums 2 and 3. Scanning means, shown as mirror drums 4 and 4a respectively, provide for the frame and line scanning movements respectively, of the scanning spots 6. A different type of scanning means, e. g. a single unit providing for both the frame and line scanning movements of the spot (e. g. a Nipkow disc or a mirror screw) may be used. Interlacing of the scanning lines in consecutive picture traversals may be provided for in any known or suitable manner. Thus, if the scanning means is arranged to produce $n + \frac{1}{2}$ line scans per picture traversal wherein $n$ is an integer, the scanning lines of consecutive picture traversals will be interlaced. Optical means of any known or suitable kind, e. g. comprising an illuminated diaphragm aperture O and lenses 5a—c are provided for producing a scanning spot 6 well defined in any position it may assume within the scanning field. The scanning field is determined by a shutter 7.

As shown in Figs. 5a—c, the film 1 and the scanning unit 4 are driven by driving units 8 (with or without index). The driving units are fed from the mains as shown, and are such, and/or are so geared to the driven units, that the spot frequency is equal to the mains frequency minus the film transport frequency. The manner in which this can be done is obvious to those familiar with the art. At the same time, provision is made for imparting to the shutter 7 up-and-down movements being, as to their dependence on time, of the saw-tooth type, and having a frequency equal to the difference between the film transport and the frame scanning frequencies.

For this purpose, the shutter 7 is preferably mechanically coupled to the film transport system and/or the frame scanning system.

As indicated in Fig. 5a, this may be done by providing a coupling or gearing system 9, 11a between the shaft 10 of one of the sprocket wheels 2 (driven by the motor 8a) and the shutter 7.

Alternatively, such a coupling or gearing system 13, 11b may be provided between the shaft of the scanning unit 4 driven by the motor 8b, and the shutter 7, as indicated in Fig. 5b.

In many cases both the scanning unit 4 and the film transport unit 2 will be geared to the same motor. Provision will then preferably be made for coupling or gearing the shutter 7 to both 2 and 4 (coupling or gearing system 13a, 11, 14, Fig. 5a.

Fig. 6 shows an embodiment of the mechanical coupling between the shutter 7 and the shaft of the sprocket drum 2. A cam 15 is mounted in fixed relationship to the sprocket wheel 2 to rotate about the same axis as said sprocket wheel, and a cam roller arm 11 carrying a cam roller 16 is attached to the shutter 7. A spring 17 also connected to the shutter 7 causes the cam roller 16 to engage against the cam 15, so that the position of the shutter 7 will be determined by the position of the cam 15. In the embodiment shown, the cam is shaped to impart to the shutter 7 two up-and-down movements of like character per revolution of the shaft 10. The number of film images transported per revolution of 10 is 4, since the number of teeth on each of the sprocket wheels is four times the number of holes flanking a film picture. Thus, if the film transport frequency $f_t$ is 24 pictures per second, the displacement frequency of the scanning field determined by the shutter 7 will be 12 up-and-down movements per second.

The cam 15 is so shaped and the mechanical coupling between 10 and 7 so arranged that the movement of 7 will be of saw-tooth character with a return period of $1/f_m$ and an amplitude equal to the height of one film picture multiplied by $1/f_m$ times the lower one of the frequencies $f_s$ and $f_t$. The details of such shaping and arrangement offer no difficulties to those skilled in the art.

It appears from the foregoing description that simple numerical relations between the frequencies involved lead to simple coupling systems and are thus desirable.

Phasing means should be provided to enable the correct phase relationship between the shutter movement and the film and spot movements to be adjusted. If the phase relationship in question is incorrect, certain parts of a film picture will be scanned more often than the rest of the same picture. As a consequence, bright bands will be visible on the received picture.

As indicated in Fig. 6, the cam 15 may be furnished with a bush 18 provided with a helical groove 19, whilst the sprocket shaft 10 is provided with a straight groove 20. A pin or feather 21 rigidly attached to a thrust rod 22 slidably engages with the two grooves 19 and 20. A movement, by means of a screw 23 against which the thrust rod 22 engages, of the pin or feather 21 in the direction of the common axis of 10 and 18, will evidently result in a rotation of the cam 15 and the sprocket wheel 2 relatively to each other about the common axis of 10 and 18. The screw 23 accordingly enables the phase relationship between the film and shutter movements to be adjusted. The optical system indicated by lenses 5 in Fig. 4 should produce a scanning spot well defined in every position within a field having the width of a film picture and a height which is equal to the height of a film picture plus $1/f_m$ times this height multiplied by the lower one of the frequencies $f_s$ and $f_t$.

I claim:

1. In a method of scanning pictures of a film moved continuously at a rate of $f_t$ pictures per second passing a given point fixed in space the steps in combination of causing a series of scanning spots to perform, over a scanning field embracing part of the picture film equal in area to one picture of the film and having its longer side disposed parallel to the longer side of any one of the film pictures, frame scanning movements in the direction opposite to the direction of the film movement and with a picture traversal frequency of $f_m$ cycles per second, $f_m$ being different from both $f_t$ and $2f_t$, and of periodically changing the position of the scanning field relatively to said fixed point at a frequency $f_d$ equal to the difference between $f_m - f_t$ and $f_t$ by steadily moving the scanning field by the height of one film picture multiplied by $1/f_m$ times the lower one of the frequencies $f_m - f_t$ and $f_t$ within a period of $1/f_d - 1/f_m$ seconds and in the direction of the faster one of the film and scanning spot movements, and by moving said scanning field back into its original position within a period of $1/f_m$ seconds.

2. In a method of scanning pictures of a film with a picture traversal frequency of $f_m$ cycles per second the steps in combination of moving the film continuously in one direction at a rate of $f_t$ pictures passing a given point fixed in space, $f_t$ being different from both $f_m$ and $f_m/2$ of causing a scanning spot to perform frame scanning movements in the direction opposite to the first said one to scan the pictures with said picture traversal frequency of $f_m$ cycles per second and of periodically changing the position of the scanning field relatively to said fixed point at a frequency $f_d$ equal to the difference between $f_m - f_t$ and $f_t$ by steadily moving the scanning field by the height of one film picture multiplied by $1/f_m$ times the lower one of the frequencies $f_m - f_t$ and $f_t$ within a period of $1/f_d - 1/f_m$ seconds and in the direction of the faster one of the film and scanning spot movements, and by moving said scanning field back into its original position within a period of $1/f_m$ seconds.

3. In a method of scanning pictures of a film moved continuously at a rate of 24 pictures per second passing a given point fixed in space the steps in combination of causing a series of scanning spots to perform, over a scanning field embracing part of the picture film equal in area to one picture of the film and having its longer side disposed parallel to the longer side of any one of the film pictures, frame scanning movements in the direction opposite to the direction of the film movement and with a picture traversal frequency of 60 cycles per second, and of periodically changing the position of the scanning field relatively to said fixed point at a frequency of 12 up-and-down movements per second by steadily moving the scanning field by $2/5$ of the height of one film picture within a period of $1/15$ of a second and in the direction of the scanning spot movement, and by moving said scanning field back into its original position within a period of $1/60$ of a second.

4. In a method of scanning pictures of a film with a picture traversal frequency of 60 cycles per second the steps in combination of moving the film continuously in one direction at a rate of 24 pictures passing a given point fixed in space, of causing a scanning spot to perform frame scanning movements in the direction opposite to the first said one to scan the pictures with said picture traversal frequency of 60 cycles per second, and of periodically changing the position of the scanning field relatively to said fixed point at a frequency of 12 up-and-down movements per second by steadily moving the scanning field by $2/5$ of the height of one film picture within a period of $1/15$ of a second and in the direction of the scanning spot movement, and by moving said scanning field back into its original position within a period of $1/60$ of a second.

5. The combination, in a picture communication system, with means adapted to guide a picture film continuously past a scanning field with a frequency of $f_t$ pictures per second, with a shutter having an aperture whose effective height is equal to the height of a film picture, for determining the scanning field, and with means for producing a succession of scanning spots adapted to scan, if a picture film is guided by the first said means past the scanning field determined by the aperture in said shutter, the pictures of said picture film, of means for imparting to said scanning spots frame scanning movements in the direction opposite to that in which the first said means are adapted to guide said film and with a picture traversal frequency $f_m$ which is different from $2f_t$, and of means for periodically displacing said shutter with a frequency $f_d$ equal to the difference between $f_m-f_t$ and $f_t$ and with a displacement amplitude equal to the height of one film picture multiplied by $1/f_m$ times the lower one of the frequencies $f_m-f_t$ and $f_t$.

6. The combination, in a system for communicating film pictures, with a shutter having an aperture whose effective height is equal to the height of one of said film pictures, for determining a scanning field, and with means for producing a succession of scanning spots adapted to scan, if a picture film is guided past the scanning field determined by the aperture in said shutter, the pictures of said picture film, of means for guiding the picture film continuously in one direction past the scanning field determined by the aperture in said shutter with a frequency of $f_t$ pictures per second, of means for imparting to said scanning spots frame scanning movements in the direction opposite to the first said one and with a picture traversal frequency $f_m$ which is different from $2f_t$, and of means for periodically displacing said shutter with a frequency $f_d$ equal to the difference between $f_m-f_t$ and $f_t$ and with a displacement amplitude equal to the height of one film picture multiplied by $1/f_m$ times the lower one of the frequencies $f_m-f_t$ and $f_t$.

7. The combination, in a system for communicating film pictures, with a shutter having an aperture whose effective height is equal to the height of one of said film pictures, for determining a scanning field, and with means for producing a succession of scanning spots adapted to scan, if a picture film is guided past the scanning field determined by the aperture in said shutter, the pictures of said picture film, of means for guiding a picture film continuously in one direction past the scanning field determined by the aperture in said shutter with a frequency of $f_t$ pictures per second, of means for imparting to said scanning spots frame scanning movements in the direction opposite to the first said one and with a picture traversal frequency $f_m$ which is different from $2f_t$, and of means for periodically displacing said shutter with a frequency $f_d$ equal to the difference between $f_m-f_t$ and $f_t$ and with a displacement amplitude equal to the height of one film picture multiplied by $1/f_m$ times the lower one of the frequencies $f_m-f_t$ and $f_t$, said means for guiding a picture film and said means for imparting scanning movements to the scanning spots being adapted to each other to make $f_t$ satisfy the condition that $f_m$ is divisible by $f_m-2f_t$.

8. The combination, in a picture communication system, with means adapted to guide a picture film continuously past a scanning field with a frequency of 24 pictures per second, with a shutter having an aperture whose effective height is equal to the height of a film picture, for determining the scanning field, and with means for producing a succession of scanning spots adapted to scan, if a picture film is guided, by the first said means past the scanning field determined by the aperture in said shutter, the pictures of said picture film, of means for imparting to said scanning spots frame scanning movements in the direction opposite to that in which the first said means are adapted to guide said film and with a picture traversal frequency of 60 cycles per second, and of means for periodically displacing said shutter with a frequency of 12 up-and-down movements per second and with a displacement amplitude equal to ⅖ of the height of one film picture.

9. The combination, in a system for communicating film pictures, with a shutter having an aperture whose effective height is equal to the height of one of said film pictures, for determining a scanning field, and with means for producing a succession of scanning spots adapted to scan, if a picture film is guided past the scanning field determined by the aperture in said shutter, the pictures of this picture film, of means for guiding a picture film continuously in one direction past the scanning field determined by the aperture in said shutter with a frequency of 24 pictures per second, of means for imparting to said scanning spots frame scanning movements in the direction opposite to the first said one and with a picture traversal frequency of 60 cycles per second, and of means for periodically displacing said shutter with a frequency of 12 up-and-down movements per second and with a displacement amplitude equal to ⅖ of the height of one film picture.

10. The combination, in a picture communication system, with means adapted to guide a picture film continuously past a scanning field with a frequency of $f_t$ pictures per second, with a shutter having an aperture whose effective height is equal to the height of a film picture for determining the scanning field, and with means for producing a succession of scanning spots adapted to scan, if a picture film is guided by the first said means past the scanning field defined by the aperture in said shutter, the pictures of said picture film, of means for imparting to said scanning spots frame scanning movements in the direction opposite to that in which the first said means are adapted to guide said film and with a picture traversal frequency $f_m$ which is different from $2f_t$, and of means for periodically displacing said shutter with a frequency $f_d$ equal to the difference between $f_m-f_t$ and $f_t$, said last mentioned means being adapted to move said shutter steadily within a period of $1/f_d-1/f_m$ seconds in the direction of the faster one of the movements which said film guiding means and said means for applying scanning movements to the scanning spots are adapted to impart to the picture film and the scanning spots respectively, and by the height of the film picture multiplied by $1/f_m$ times the lower one of the frequencies $f_m-f_t$ and $f_t$, said shutter displacing means being further adapted to move, subsequently to the last defined movement, said shutter steadily back into its original position within a period of $1/f_m$ seconds.

11. The combination, in a picture communication system, with means adapted to guide a picture film continuously past a scanning field with a frequency of $f_t$ pictures per second, with a shutter having an aperture whose effective height is equal to the height of a film picture for determining the scanning field, and with means for producing a succession of scanning spots adapted to scan, if a picture film is guided, by the first said means, past the scanning field defined by the aperture in said shutter, the pictures of said picture film, of means for imparting to said scanning spots frame scanning movements in the direction opposite to that in which the first said means are adapted to guide said film and with a picture traversal frequency $f_m$ which is different from $2f_t$, and of means coupled to said means for imparting scanning movements to said scanning spots for periodically displacing said shutter with a frequency $f_d$ equal to the difference between $f_m-f_t$ and $f_t$ and with a displacement amplitude equal to the height of one film picture multiplied by $1/f_m$ times the lower one of the frequencies $f_m-f_t$ and $f_t$.

12. The combination, in a system for communicating film pictures, with a shutter having an aperture whose effective height is equal to the height of one of said film pictures, for determining a scanning field, and with means for producing a succession of scanning spots adapted to scan, if a picture film is guided past the scanning field determined by the aperture in said shutter, the pictures of this picture film, of means for guiding a picture film continuously in one direction past the scanning field determined by aperture in said shutter with a frequency of $f_t$ pictures per second, of means for imparting to said scanning spots frame scanning movements in the direction opposite to the first said one and with a picture traversal frequency $f_m$ which is different from $2f_t$, and of means, coupled to said film guiding means, for periodically displacing said shutter with a frequency $f_d$ equal to the difference between $f_m-f_t$ and $f_t$ and with a displacement amplitude equal to the height of one film picture multiplied by $1/f_m$ times the lower one of the frequencies $f_m-f_t$ and $f_t$.

13. The invention set forth in claim 12, wherein said film guiding means comprise a sprocket wheel, and wherein said means for displacing said shutter comprise a cam mounted in fixed relationship to said sprocket wheel to rotate about the same axis as said sprocket wheel, a cam roller arm attached to said shutter, a cam roller mounted on said cam roller arm, a spring connected to said shutter to cause the cam roller to engage against said cam, the shape of the cam being correlated to the number of teeth on said sprocket wheel, the frequencies $f_m$ and $f_t$, and the geometry of said cam roller arm to move said shutter steadily within a period of $1/f_d-1/f_m$ seconds in the direction of the faster one of the movements which said film guiding means and said means for applying scanning movements to the scanning spots are adapted to impart to the picture film and the scanning spots respectively, and by the height of a film picture multiplied by $1/f_m$ times the lower one of the frequencies $f_m-f_t$ and $f_t$, and to move, subsequently to the last defined movement, said shutter steadily back into its original position within a period of $1/f_m$ seconds.

14. The combination, in a picture communication system, with means adapted to guide a picture film continuously past a scanning field with a frequency of $f_t$ pictures per second, and with a shutter having an aperture whose effective height is equal to the height of a film picture, for determining the scanning field, of means for producing a succession of scanning spots adapted to scan, if a picture film is guided by the first said means past the scanning field determined by the aperture in said shutter, the pictures of said film, of means for imparting to said scanning spots frame scanning movements in the direction opposite to that in which the first said means are adapted to guide said film and with a picture traversal frequency $f_m$ which is different from $2f_t$, and of means for periodically displacing said shutter with a frequency $f_d$ equal to the difference between $f_m-f_t$ and $f_t$, said last mentioned means being adapted to move said shutter steadily with a period of $1/f_d-1/f_m$ seconds in the direction of the faster one of the movements which said film guiding means and said means for applying scanning movements to the scanning spots are adapted to impart to the picture film and the scanning spots respectively, and by the height of a film picture multiplied by $1/f_m$ times the lower one of the frequencies $f_m-f_t$ and $f_t$, said shutter displacing means being further adapted to move, subsequently to the last defined movement, said shutter steadily back into its original position within a period of $1/f_m$ seconds, said scanning spot producing means comprising optical means adapted to produce, in the region where to guide the film past the shutter said film guiding means are adapted, scanning spots which are well defined over the whole height of the film picture plus the $f_m$-th part of this height multiplied by the lower one of the frequencies $f_m-f_t$ and $f_t$.

15. In a method of scanning pictures of a film with a picture traversal frequency of $f_m$ cycles per second the steps in combination of moving the film continuously in one direction at a rate of $f_t$ pictures passing a given point fixed in space, $f_t$ being different from both $f_m$ and $f_m/2$ and satisfying the condition that $f_m$ is divisible by $f_m-2f_t$, of causing a scanning spot to perform frame scanning movements in the direction opposite to the first said one to scan the pictures with said picture traversal frequency of $f_m$ cycles per second, and of periodically changing the position of the scanning field relatively to said fixed point at a frequency $f_d$ equal to the difference between $f_m-f_t$ and $f_t$ by steadily moving the scanning field by the height of one film picture multiplied by $1/f_m$ times the lower one of the frequencies $f_m-f_t$ and $f_t$ within a period of $1/f_d-1/f_m$ seconds and in the direction of the faster one of the film and scanning spot movements, and by moving said scanning field back into its original position within a period of $1/f_m$ seconds.

ALBERT ERNEST ADAMS.